(12) United States Patent
Ostrander et al.

(10) Patent No.: US 7,484,291 B1
(45) Date of Patent: Feb. 3, 2009

(54) METHOD OF MANUFACTURING A DISK DRIVE WITH A LEAD FRAME ENGAGED WITHIN A HOST ELECTRONIC UNIT SOCKET

(75) Inventors: Daniel R. Ostrander, Lake Forest, CA (US); William W. Garrett, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 306 days.

(21) Appl. No.: 11/386,320

(22) Filed: Mar. 20, 2006

Related U.S. Application Data

(62) Division of application No. 10/183,067, filed on Jun. 26, 2002, now abandoned.

(51) Int. Cl.
*G11B 5/48* (2006.01)
(52) U.S. Cl. .................. 29/603.03; 29/603.04; 29/827; 361/685; 361/813; 360/97.01; 360/98.01
(58) Field of Classification Search ............. 29/603.03, 29/603.04, 827; 361/683, 684, 685, 813; 360/97.01, 98.01
See application file for complete search history.

(56) References Cited

U.S. PATENT DOCUMENTS

| | | | |
|---|---|---|---|
| 3,381,372 A * | 5/1968 | Capano | 29/827 |
| 4,102,039 A * | 7/1978 | Henrickson et al. | 29/827 X |
| 4,862,584 A | 9/1989 | Budy et al. | |
| 5,243,495 A | 9/1993 | Read et al. | |
| 5,264,975 A | 11/1993 | Bajorek et al. | |
| 5,276,577 A | 1/1994 | Brooks et al. | |
| 5,282,099 A | 1/1994 | Kawagoe et al. | |
| 5,307,929 A * | 5/1994 | Seidler | 29/827 X |
| 5,488,523 A | 1/1996 | Seaver et al. | |
| 5,601,444 A | 2/1997 | Cox | |
| 5,697,266 A | 12/1997 | Wilson, Jr. | |
| 5,918,068 A | 6/1999 | Shafe | |

(Continued)

FOREIGN PATENT DOCUMENTS

JP        03155143 A  *  7/1991

(Continued)

OTHER PUBLICATIONS

Office Action dated Feb. 9, 2004 from U.S. Appl. No. 10/183,067, 5 pages.

(Continued)

*Primary Examiner*—A. Dexter Tugbang

(57) ABSTRACT

A method of manufacturing a disk drive for use with a host electronic unit (HEU). The HEU including a printed circuit board having a socket and HEU disk drive circuitry. The method includes providing a lead frame. The lead frame is a single component having material continuity rather than an assembly of subcomponents. The method includes forming a plurality of leads in the lead frame by removing material of the lead frame, and attaching the lead frame to a housing body. The housing body defines a housing periphery sized and configured to be engaged within the socket. The leads extend to the housing periphery. The method includes attaching a disk drive electrical component to the housing body, and electrically connecting the disk drive electrical component to at least one of leads. The disk drive circuitry is located on the HEU printed circuit board rather than within the housing periphery.

10 Claims, 9 Drawing Sheets

U.S. PATENT DOCUMENTS

| | | | |
|---|---|---|---|
| 6,219,909 B1 * | 4/2001 | Ogawa et al. | 360/97.01 X |
| 6,430,000 B1 * | 8/2002 | Rent | 361/685 X |
| 6,594,107 B2 | 7/2003 | Hayakawa et al. | |
| 6,678,109 B2 | 1/2004 | Kagami et al. | |

FOREIGN PATENT DOCUMENTS

| | | |
|---|---|---|
| JP | 04057274 A | 2/1992 |
| JP | 04111290 A | 4/1992 |
| JP | 07169245 A | 7/1995 |

OTHER PUBLICATIONS

Office Action dated Jun. 24, 2004 from U.S. Appl. No. 10/183,067, 10 pages.

Office Communication dated Jan. 11, 2005 from U.S. Appl. No. 10/183,067, 2 pages.

Office Communication dated May 12, 2005 from U.S. Appl. No. 10/183,067, 3 pages.

Office Communication dated Jun. 20, 2005 from U.S. Appl. No. 10/183,067, 2 pages.

Final Office Action dated Sep. 21, 2005 from U.S. Appl. No. 10/183,067, 10 pages.

Office Communication dated Feb. 23, 2006 from U.S. Appl. No. 10/183,067, 2 pages.

* cited by examiner

METHOD OF MANUFACTURING A DISK DRIVE WITH A LEAD FRAME ENGAGED WITHIN A HOST ELECTRONIC UNIT SOCKET

CROSS-REFERENCE TO RELATED APPLICATIONS

This application is a divisional patent application of U.S. application Ser. No. 10/183,067, entitled DISK DRIVE HOUSING INCLUDING HOUSING BODY WITH LEADS EXTENDING TO HOUSING PERIPHERY, filed on Jun. 26, 2002, the entire contents of which are incorporated herein by reference. In addition, this application is related to U.S. application Ser. No. 10/183,069, entitled HOST ELECTRONIC UNIT WITH DISK DRIVE SOCKET FOR INTERNAL ENGAGEMENT WITH DISK DRIVE, filed on Jun. 26, 2002, now abandoned, the entire contents of which are incorporated herein by reference.

FIELD OF THE INVENTION

The present invention relates generally to disk drives, and more particularly to a method of manufacturing a disk drive with a lead frame engaged within a host electronic unit socket.

DESCRIPTION OF THE PRIOR ART

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data to and from the disk. As discussed further below, the printed circuit board includes functional portions of which may be characterized as spindle motor drive circuitry, actuator drive circuitry, and read channel circuitry.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which extend from an opposite side of the actuator body. The actuator assembly includes the actuator body which has a bore and a pivot bearing cartridge engaged within the bore. A head gimbal assembly includes at least one transducer head, sometimes two, which is distally attached to each of the actuator arms.

The flex circuit cable assembly includes a flex circuit cable which is attached to the actuator assembly and electrically connects the various electrical components onboard the head stack assembly with a relatively minimal impact upon its pivoting movement. The actuator drive circuitry is configured to generate servo control signals. The head stack assembly is controllably positioned in response to the generated servo control signals from the actuator drive circuitry. In so doing, the attached heads are moved relative to tracks disposed upon the disk. As such, the flex circuit cable houses electrical connections between actuator drive circuitry and the coil portion of the actuator assembly. Further, the read channel circuitry is configured to receive data signal from the heads. As such, the flex circuit cable further houses the electrical connections between the read channel circuitry and the heads.

The spindle motor includes a hub that is rotatably attached to the disk drive base. The hub has an outer flange that supports one of the disks. Additional disks may be stacked and separated with spacers. The spindle motor further includes an annular magnet and a spindle motor stator. Where space efficiency is of vital concern, the magnet is typically attached about the lowermost portion of the hub below the flange. The magnet consists of a predetermined number of N and S poles that are disposed alternately circumferentially about the magnet. The spindle motor stator includes an outer rim that is attached to the disk drive base and a plurality of internally facing stator teeth. The stator teeth are equally spaced and extend from the stator rim. The spindle motor stator is sized to fit about the hub and in particular the magnet. Each stator tooth includes windings which selectively conduct current to create a magnetic field that interacts with the various poles of the magnet. Such interaction results in forces applied to the hub which tend to rotate the hub. The spindle motor drive circuitry is configured to generate electrical signals to the stator, and in particular the windings thereof, for controlling the movement of the spindle motor.

Such disk drives may have a variety of applications in any number of host electronic devices, such as hand held or portable devices such as computer laptops, cellular telephones, personal digital assistants (PDA), digital cameras, etc. A topic of concern is the desire to reduce the overall disk drive size and well as that of the associated host electronic device. In this regard, a disk drive may be of an internal nature or externally connectable such as in an external port or other interface of the associated host electronic unit. In this regard, one particular area of focus is the mechanical and electrical connections between the various electrical components of the disk drive and the associated host electronic unit. Accordingly, there is a need in the art for an improved arrangement for the electrical connections between various disk drive electrical components and the associated host electronic unit in comparison to the prior art.

SUMMARY

An aspect of the invention can be regarded as a method of manufacturing a disk drive for use with a host electronic unit (HEU). The HEU includes a printed circuit board having a disk drive socket and HEU disk drive circuitry in electrical communication with the disk drive socket. The method includes providing a lead frame. The lead frame is a single component having material continuity rather than an assembly of subcomponents. The method further includes forming a plurality of leads in the lead frame by removing material of the lead frame. The method further includes attaching the lead frame to a housing body. The housing body defines a housing periphery sized and configured to be engaged within the disk drive socket. The plurality of leads extend to the housing periphery for electrically communicating with the disk drive circuitry with the housing body being internally engaged within the disk drive socket. The method further includes attaching a disk drive electrical component to the housing body. The method further includes electrically connecting the disk drive electrical component to at least one of the plurality of leads, the leads allowing the HEU disk drive circuitry to control the disk drive electrical component. The disk drive circuitry is located on the HEU printed circuit board rather than within the housing periphery.

According to various embodiments, the lead frame may be formed from a carrier strip. The forming of the plurality of leads in the lead frame may include trimming the lead frame. The trimming of the lead frame may occur prior to or after attaching of the lead frame to a housing body. The forming of the plurality of leads in the lead frame may include stamping the lead frame. The housing body and the lead frame may be separately formed. The housing body may be formed from a carrier strip. The housing body may be formed by a stamping process. The attaching of the lead frame to a housing body may include stamping the lead frame and the housing body. The disk drive component may be a spindle motor and/or head stack assembly, for examples.

DESCRIPTION OF THE PREFERRED EMBODIMENTS

Figure 1:
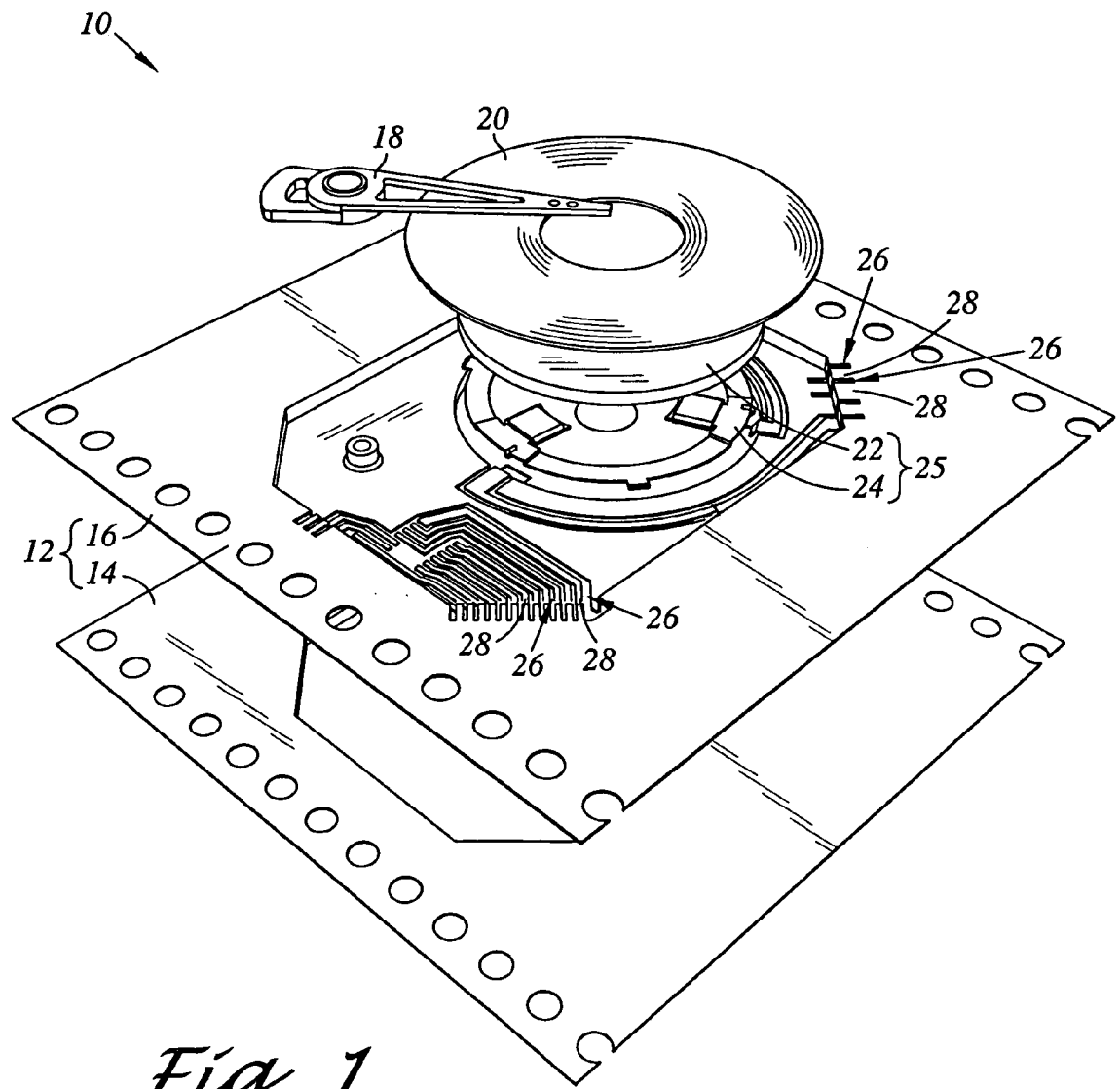
FIG. 1 is an exploded perspective view of a disk drive with a disk drive housing including housing body (in a stamped form embodiment) and a lead frame and disk drive components, as shown during fabrication before completion.

Referring now to the drawings wherein the showings are for purposes of illustrating preferred embodiments of the present invention only, and not for purposes of limiting the same, FIGS. 1-14 illustrate disk drives during various phases of manufacture in accordance with the aspects of the present invention.

Referring now to FIG. 1, there is depicted an exploded perspective view of a disk drive 10 as shown during fabrication before completion. The disk drive 10 includes a disk drive housing 12. The disk drive housing 12 includes a housing body 14 and a lead frame 16. In the embodiment shown, the housing body 14 is formed of a stamped material, such as a stamped metal material. The lead frame 16 may be likewise formed of a stamped material. An electrically conductive material such as a thin metal may be utilized to form the lead frame 16. The disk drive 10 further includes a head stack assembly 18 and at least one magnetic disk 20 supported by a spindle motor hub 22. A spindle motor stator 24 is configured to interact with the hub 22 to form a spindle motor 25 for rotating the hub 22. It is contemplated that the stamped nature of the housing body 14 and the lead frame 16 readily facilitates formation of geometric features and details to accommodate the attachment and positioning of the various disk drive components such as the head stack assembly 18, the magnetic disk 20, the spindle motor hub 22, and the spindle motor stator 24. Furthermore, the lead frame 16 is formed to include elongate gaps 26. The gaps 26 define a plurality of leads 28 formed in the lead frame 16 as shown and discussed in detail in reference to FIGS. 3 and 4 below.

Figure 2:
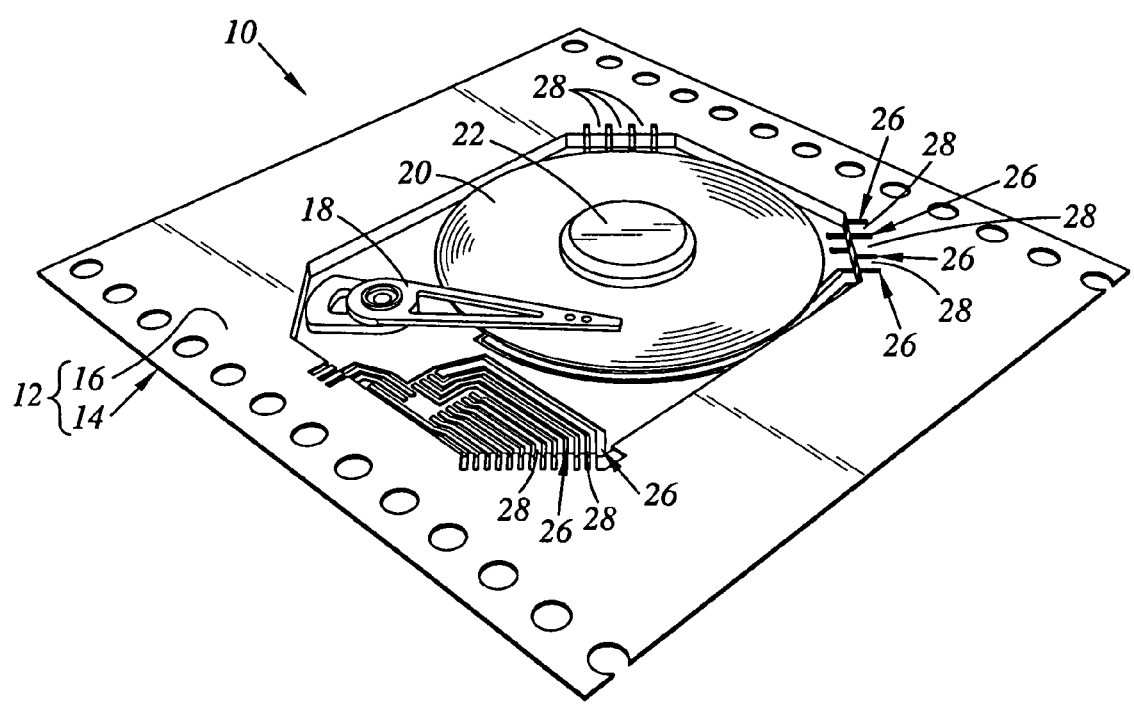
FIG. 2 is a perspective view of the disk drive of FIG. 1 as assembled.

Referring now additionally to FIG. 2, there is depicted the disk drive 10 of FIG. 1 as assembled. In this regard, substantial structural integrity of the disk drive housing 12 is associated with the housing body 14. The housing body 14 is attached to the lead frame 16 via any number of attachment processes well known in the art such as a stamping process or adhesive bonding for example. In practice, though not shown, an insulative layer or coating is disposed between the housing body 14 and the lead frame 16 to insulate the lead frame 16 from electrically shorting through conductive contact with the housing body 14 in this metal material embodiment.

Figure 3:
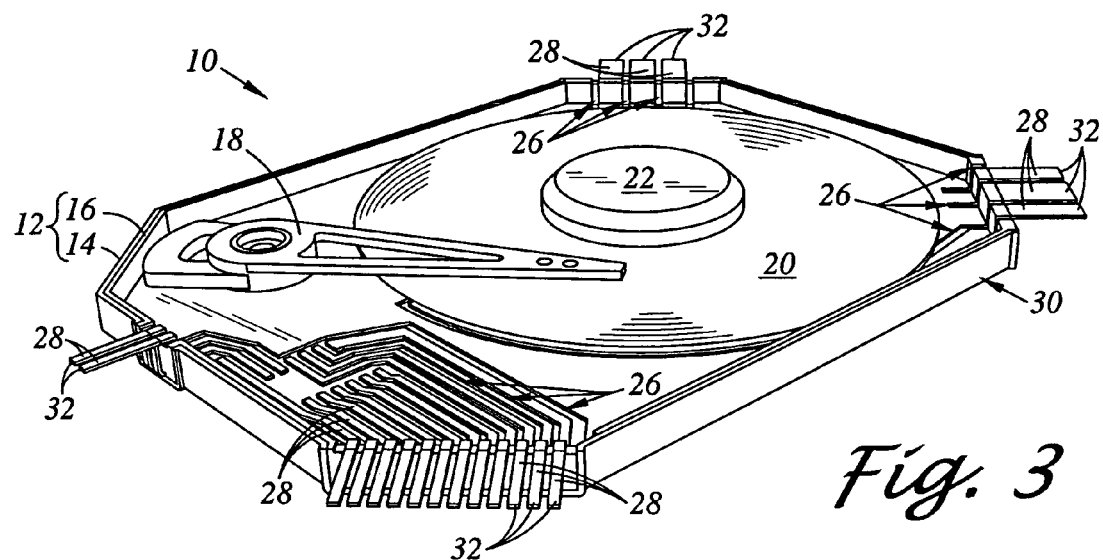
FIG. 3 is a perspective view of the disk drive of FIG. 2 with portions of the housing body and lead frame trimmed for forming leads and for sizing.

Referring now additionally to FIG. 3, there is depicted a perspective view of the disk drive 10 of FIG. 2 with portions of the housing body 14 and the lead frame 16 having been trimmed off or otherwise removed during the fabrication process. It is contemplated that the trimming process may occur before or after the attachment of the housing body 14 to the lead frame 16. At this stage, the housing body 14 is formed to define a housing periphery 30. As can be seen, the trimming of the lead frame 16 defines the leads 28. In this regard, the selective layout of the elongate gaps 26 and trimming of the lead frame 16 crosswise to the gaps 26 results the formation of the leads 28 having distal ends 32 disposed generally outwardly facing of the lead frame 16. Moreover, the leads 28 are generally arrayed to extend to the housing periphery 30.

Figure 4:
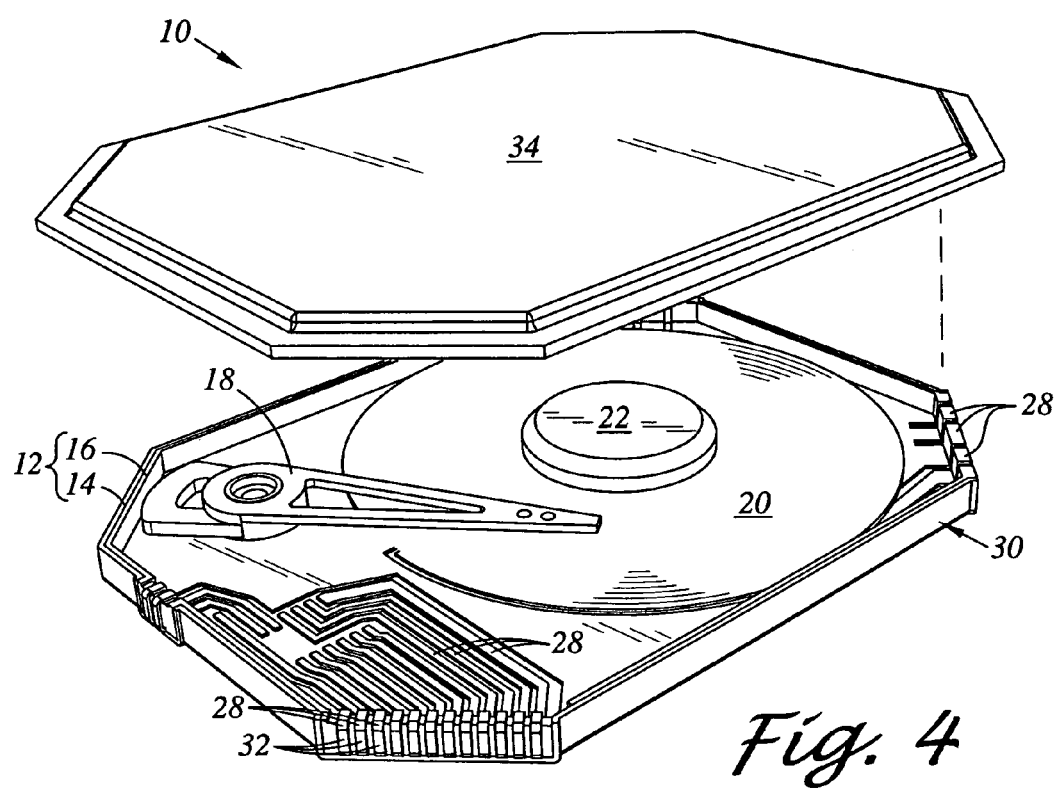
FIG. 4 is a perspective view of the disk drive of FIG. 3 with the leads formed about the housing body and shown with a cover.

Referring now additionally to FIG. 4, there is depicted a perspective view of the disk drive 10 of FIG. 3. The distal ends 32 of the plurality of leads 28 are formed about the housing body 14 at the housing periphery 30. This may be accomplished via a bending process for example. In the embodiment shown, the leads 28 are formed to be of a J-lead or butt lead configuration. A cover 34 is shown in exploded view above the housing body 14. The cover 34 further defines the disk drive housing 12 and is attached to the housing body 14 for cooperatively enclosing various other disk drive components therein.

Figure 5:
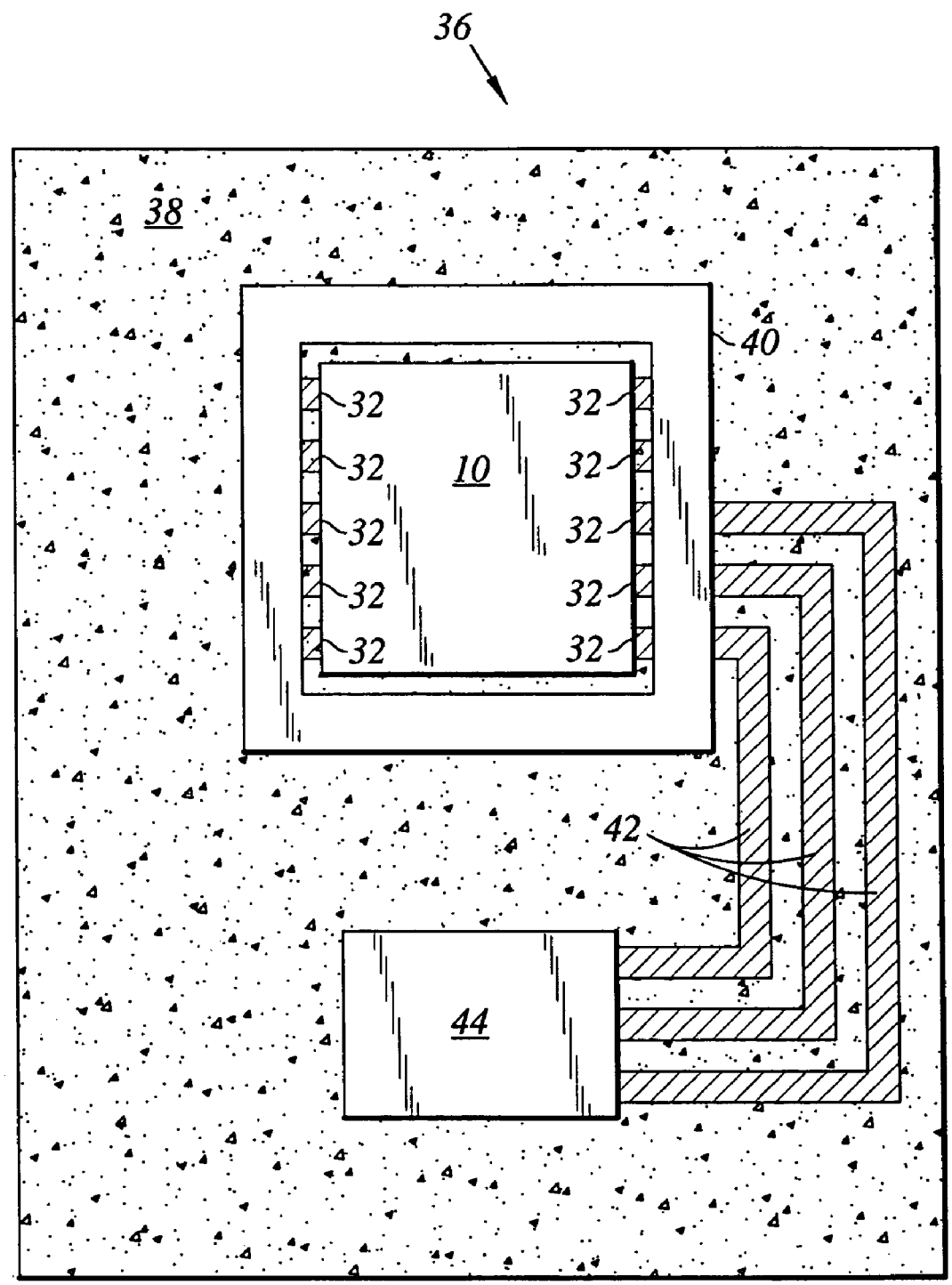
FIG. 5 is a symbolic diagram of the disk drive of FIG. 4 as received by a socket mounted upon a printed circuit board of a host electronic unit.

Referring now additionally to FIG. 5, there is depicted a symbolic diagram of the disk drive 10 of FIG. 4 as shown in relation to a host electronic unit 36 that utilizes the disk drive 10. The host electronic unit 36 includes a printed circuit board 38. A disk drive socket 40 is mounted upon the printed circuit board 38. The disk drive 10 communicates with the disk drive socket 40 via the distal ends 32. Disk drive circuitry 44 is disposed upon the printed circuit board 38 in electrical communication with the disk drive socket 40. Electrical interconnections 42 are representatively shown between the disk drive socket 40 and the disk drive circuitry 44.

According to an aspect of the invention there is provided the disk drive housing 12 for use with the host electronic unit 36. The host electronic unit 36 includes the printed circuit board 38 with the disk drive socket 40 and the disk drive circuitry 44 in electrical communication with the disk drive socket 40. The disk drive housing 12 includes the housing body 14 defining the housing periphery 30. The housing periphery 30 is sized and configured to be internally engaged within the disk drive socket 40. The disk drive housing 12 further includes the lead frame 16 attached to the housing body 14. The lead frame 16 includes the plurality of leads 28 extending to the housing periphery 30 for electrically communicating with the disk drive circuitry 44 with the housing body 14 being internally engaged within the disk drive socket 40. It is contemplated that the peripheral nature of the leads 28 facilitates a generally low height profile of the overall disk drive 10 and that of the associated host electronic unit 36. Moreover, advantages may be realized in connection with fabrication efficiencies through the use of carrier strip technology for production of the housing body 14 and the lead frame 16. As such, this design may tend to lend itself to mass production techniques. Further, in this embodiment, the stamped nature of the housing body 14 and the lead frame 16 facilitates ease of design changes with respect to modification of various lead configurations.

It is contemplated that the disk drive circuitry 44 may include spindle motor drive circuitry for controlling the spindle motor 25. In this regard, the spindle motor drive circuitry generates electrical signals that are passed to windings of the spindle motor stator 24 via the leads 28 for controlling the rotational movement of the hub 22. The disk drive circuitry 44 may include actuator drive circuitry for controlling movement of the head stack assembly 18 relative to the disk 20. Further, the disk drive circuitry 44 may include read channel circuitry for receiving electrical signals from the head stack assembly 18 representative of data disposed upon the disk 20.

As used herein, the housing body 14 being internally engaged within the disk drive socket 40 refers to at least a portion of the disk drive socket 40 being physically disposed about the housing periphery 30 and configured to electrically communicate with the leads 28 disposed at the housing periphery 30.

According to another aspect of the present invention there is provided the disk drive 10 for use with the host electronic unit 36 including the printed circuit board 38 with the disk drive socket 40 and disk drive circuitry 44 in electrical communication with the disk drive socket 40. The disk drive 10 includes the disk drive housing 12 as described above. The disk drive 10 further includes a disk drive electrical component, such as the spindle motor 25 or the head stack assembly 18, attached to the disk drive housing 12 in electrical communication with at least one of the plurality of leads 28.

Figure 6:
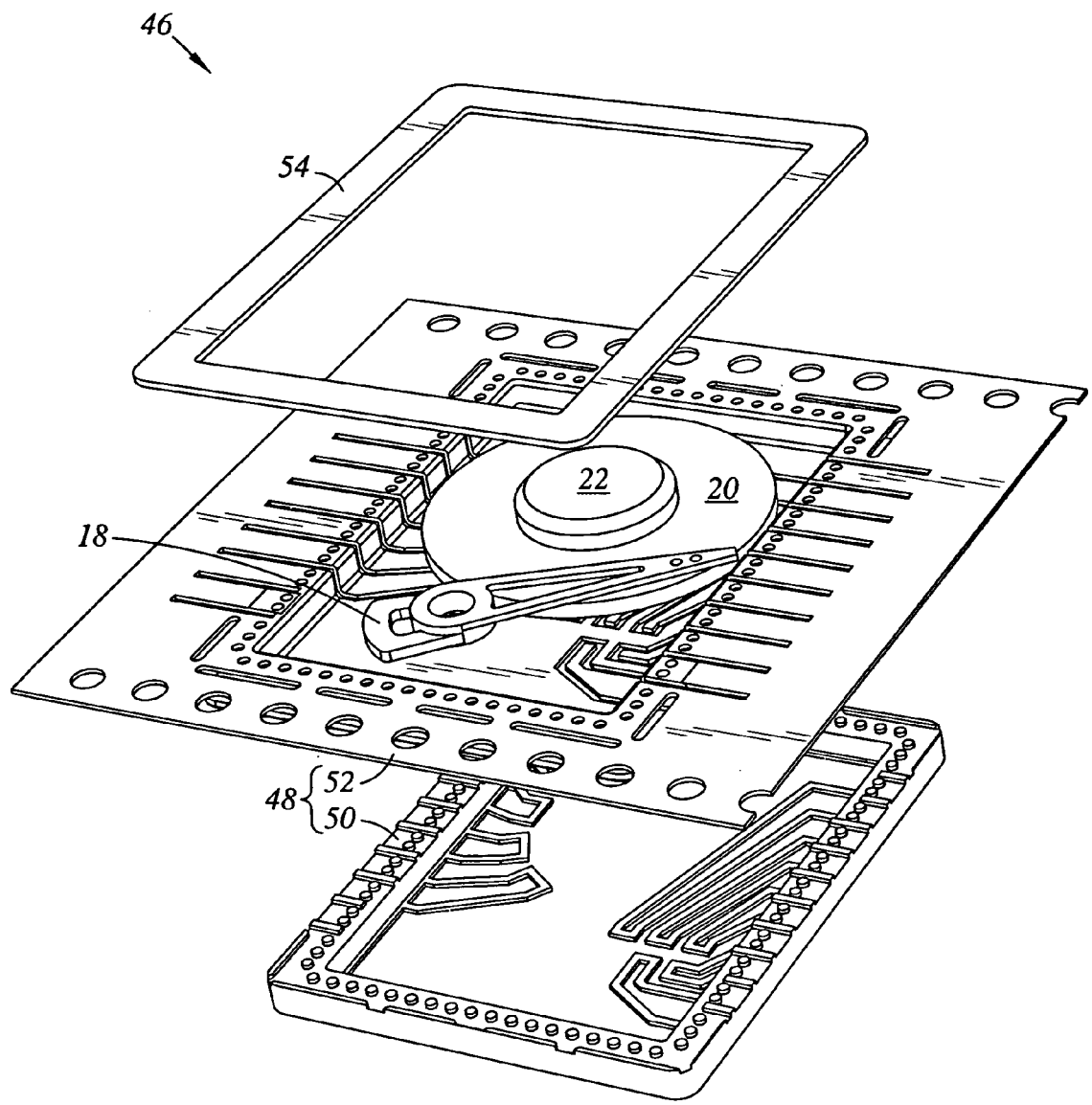
FIG. 6 is an exploded perspective view of a disk drive with a disk drive housing including a housing body (in overmolded form embodiment) and a lead frame and disk drive components, as shown during fabrication before completion.
Figure 7:
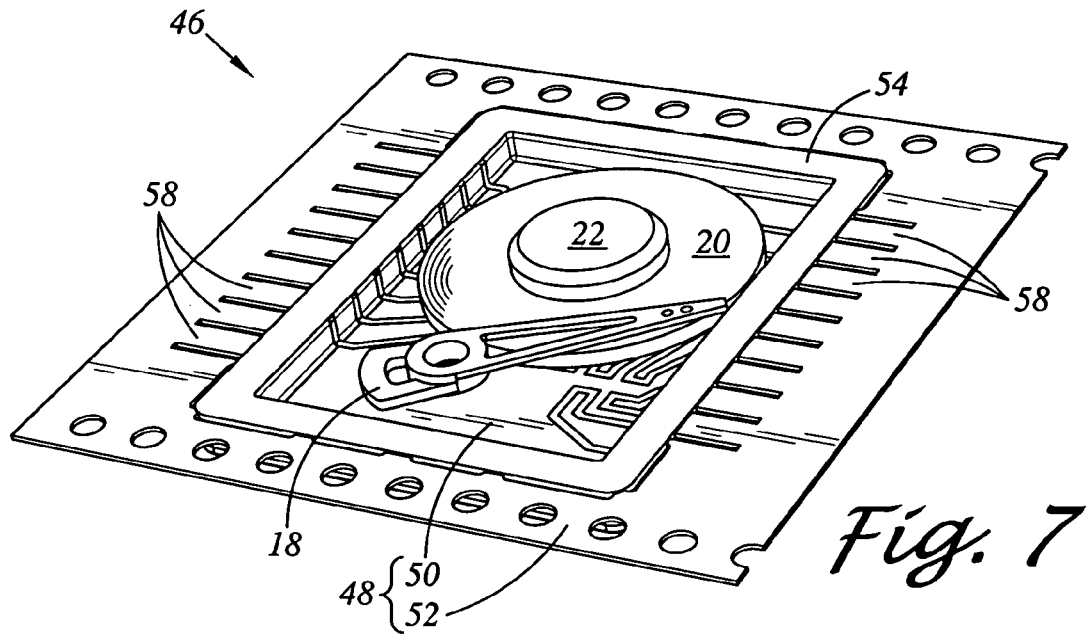
FIG. 7 is a perspective view of the disk drive of FIG. 6 as assembled.

As shown in FIGS. 6-10, there is depicted a disk drive 46 according to another embodiment. Referring to FIG. 6 there is an exploded perspective view of the disk drive 46 as shown during fabrication before completion. The disk drive 46 is similar in construction to the disk drive 10 as described above except for those differences noted below. The disk drive 46 includes a disk drive housing 48. The disk drive housing 48 includes a housing body 50 and a lead frame 52. In this embodiment, the housing body 50 is formed of a molded material. For example, the housing body 50 may be formed of a molded plastic material. The lead frame 52 may be constructed similar to that of lead frame 16 described above. As the housing body 50 is of a molded nature, it is integrally formed about the lead frame 52. In this regard, it is understood that the housing body 50 is shown separately from the lead frame 52 for ease of illustration. The disk drive housing 48 may further include a frame 54 for attachment to the lead frame 52 opposite the housing body 50. The frame 54 may be integrally formed with the housing body 50 during the molding process. FIG. 7 depicts the disk drive 46 of FIG. 6 with the housing body 50 and the frame 54 as integrally formed about the lead frame 52.

Figure 8:
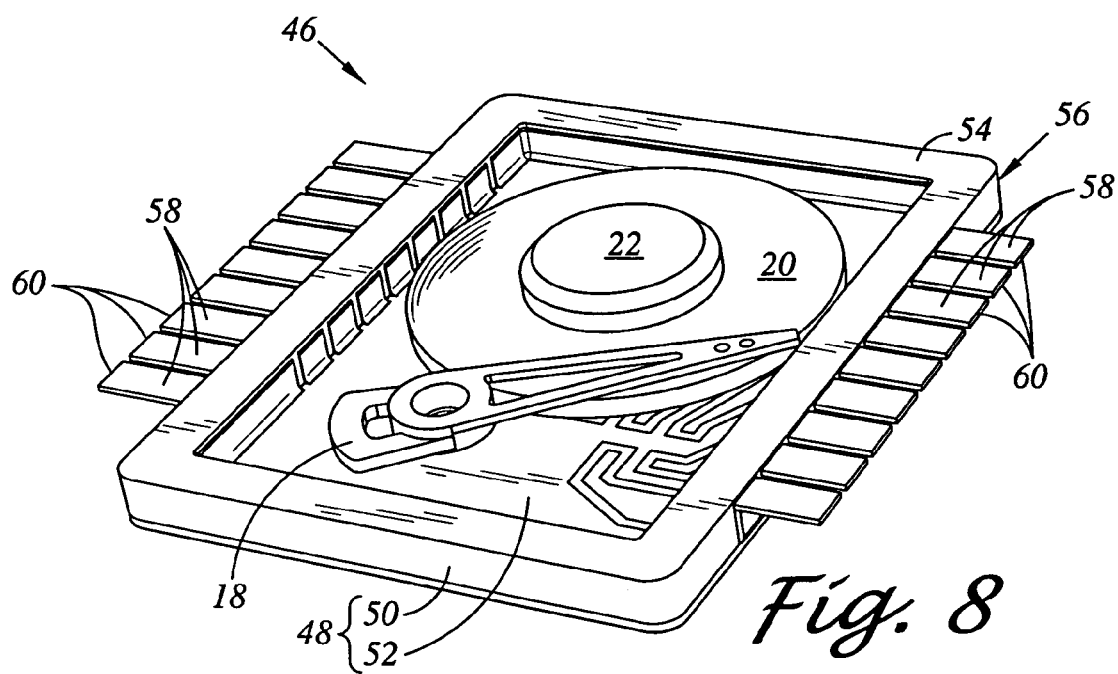
FIG. 8 is a perspective view of the disk drive of FIG. 7 with portions of the housing body and lead frame trimmed for forming leads and for final sizing.

Referring now additionally to FIG. 8 there is depicted a perspective view of the disk drive 46 of FIG. 7 with portions of the housing body 50 and the lead frame 52 having been trimmed off or otherwise removed during the fabrication process. At this stage, the housing body 50 is formed to define a housing periphery 56. As can be seen, the trimming of the lead frame 52 defines a plurality of leads 58. The leads 58 have distal ends 60 disposed generally outwardly facing of the lead frame 52. Moreover, the leads 58 are generally arrayed to extend to the housing periphery 56.

Figure 9:
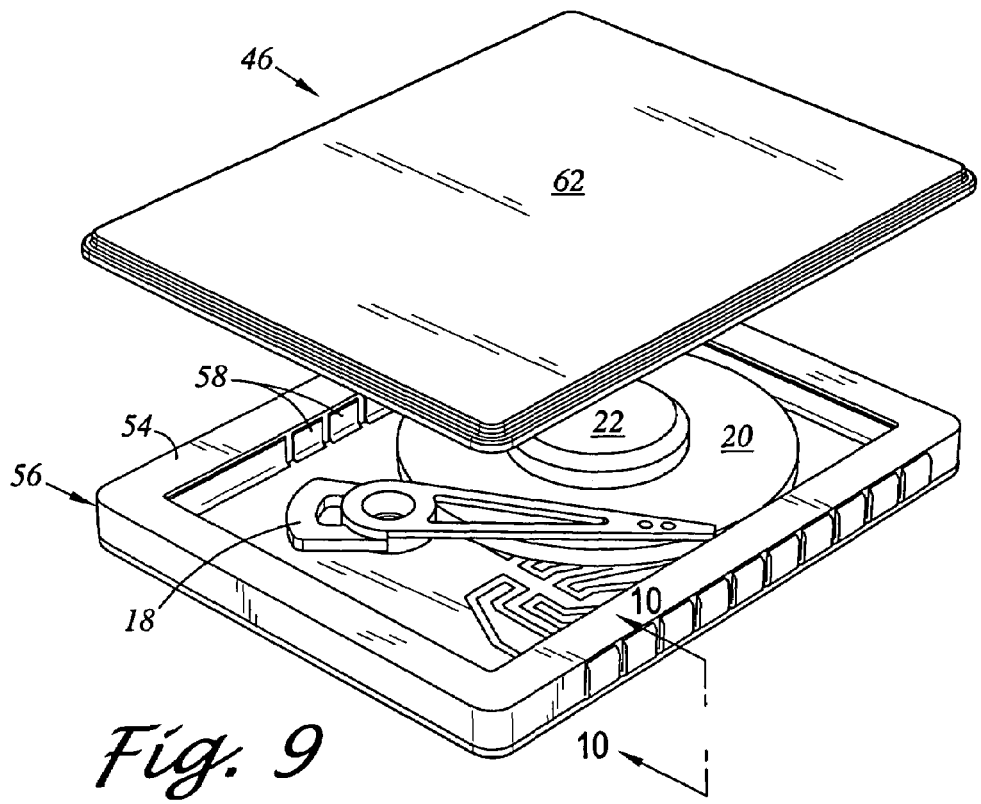
FIG. 9 is a perspective view of the disk drive of FIG. 8 with the leads formed about the housing body and shown with a cover.

Referring now additionally to FIG. 9, there is depicted a perspective view of the disk drive 46 of FIG. 8. The distal ends 60 of the plurality of leads 58 are formed about the housing body 50 at the housing periphery 56. In the embodiment shown, the leads 58 are formed to be of a J-lead or butt lead configuration. A cover 62 is shown in exploded view above the housing body 50. The cover 62 further defines the disk drive housing 48 and is attached to the housing body 50 for cooperatively enclosing various other disk drive components therein.

Figure 10:
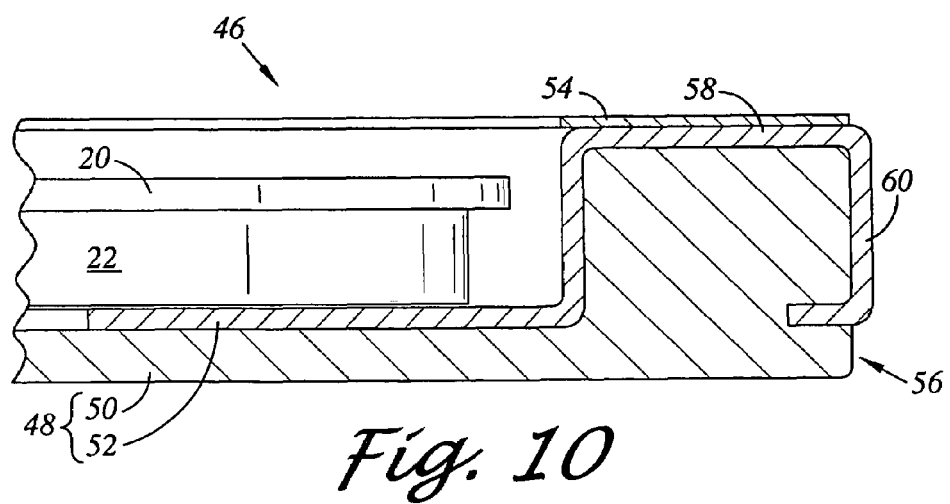
FIG. 10 is a cross sectional view of a portion of the disk drive of FIG. 9 as seen along axis 10-10 and in particular of a lead disposed thereat in a J-lead configuration.

Referring now additionally to FIG. 10, there depicted is a cross sectional view of a portion of the disk drive 46 of FIG. 9 as seen along axis 10-10. As can be seen the lead 58 is disposed in a J-lead or butt lead configuration with the distal end 60 externally disposed at the housing periphery 56.

Figure 11:
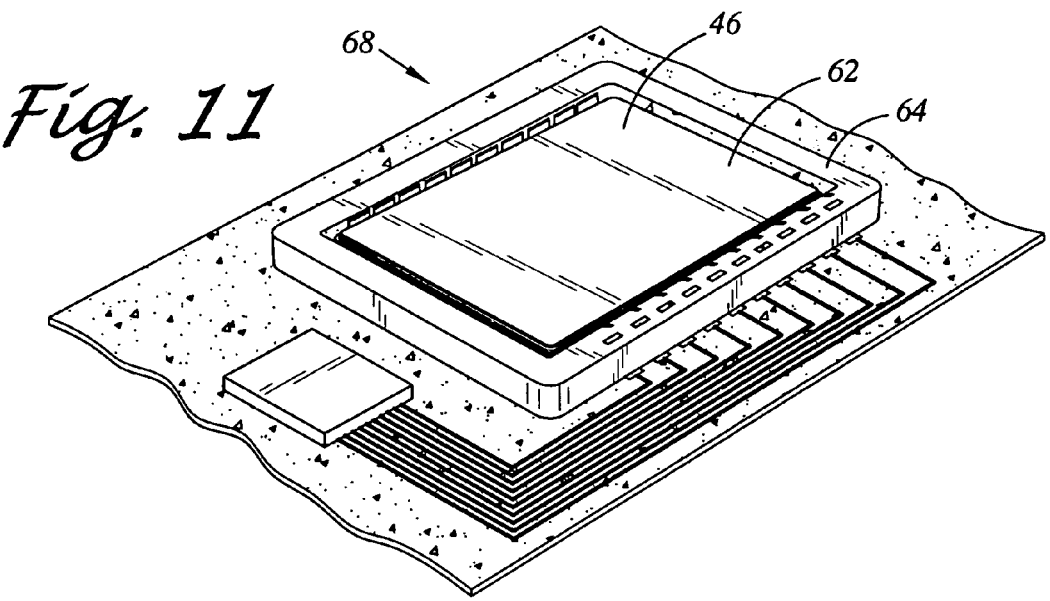
FIG. 11 is a perspective view of the disk drive of FIG. 9 with the cover attached as shown as being received by a socket mounted upon a printed circuit board of a host electronic unit.

Referring now additionally to FIG. 11, there is depicted a perspective view of the disk drive 46 of FIG. 9 with the cover 62 attached. The disk drive 46 is shown as being received by a disk drive socket 64 mounted upon a printed circuit board 66 of a host electronic unit 68 similar in construction as the host electronic unit 36 described above.

Figure 12:
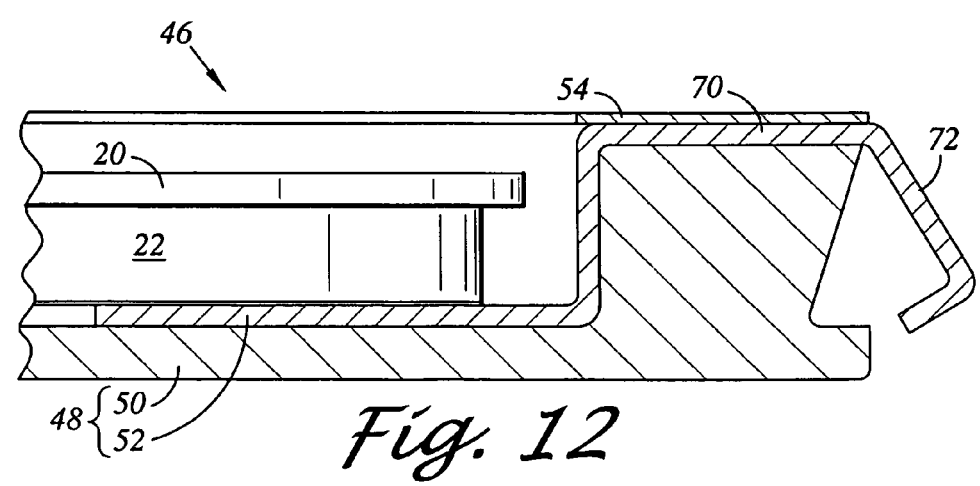
FIG. 12 is a cross sectional view of a portion of a disk drive similar to that of FIG. 10, however, with a lead in a compression contact configuration.

Referring now to FIG. 12, there is depicted a cross sectional view of a portion of a disk drive similar to the disk drive 46 of FIG. 10, however, with the lead 58 substituted with a lead 70. Lead 70 is disposed in a compression contact configuration according to another embodiment of the present invention. In this regard, lead 70 includes a distal end 72 that is deformed radially outward from the housing body 50. Upon the housing body 50 being received in a disk drive socket 64, it is contemplated that the distal end 72 is deflected towards the housing body 50 and exerts a compressive force in response for facilitating electrical contact and mechanical engagement.

Figure 13:
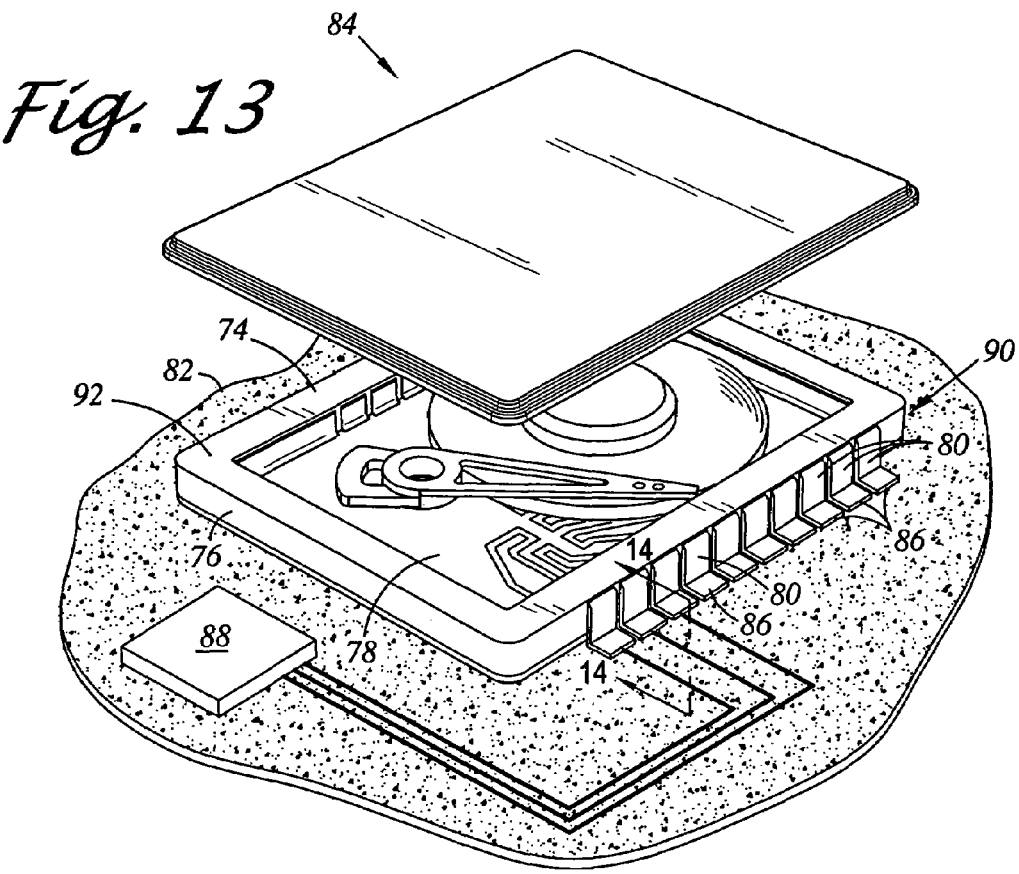
FIG. 13 is a perspective view of a disk drive similar to that of FIG. 9, however, with leads in a surface mount configuration as shown with a portion of a printed circuit board of a host electronic unit.
Figure 14:
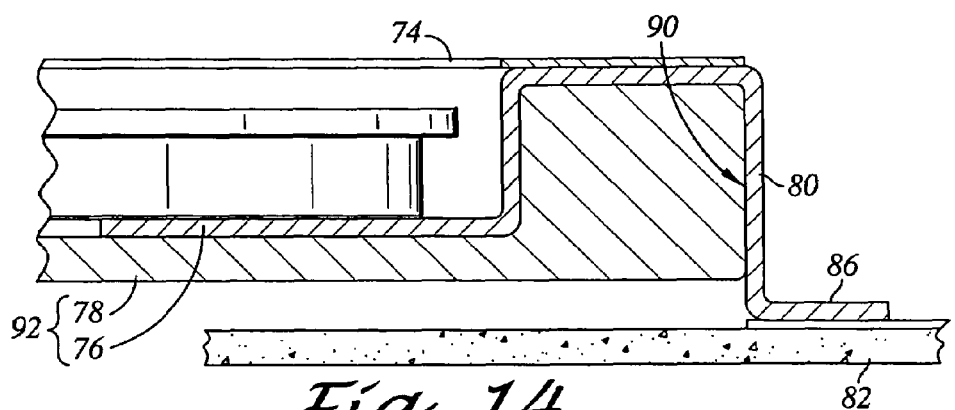
FIG. 14 is a cross sectional view of a portion of the disk drive of FIG. 13 as seen along axis 14-14 and in particular of a lead disposed thereat in a surface mount configuration.

As shown in FIGS. 13 and 14, there is depicted a disk drive 74 according to another aspect of the present invention. FIG. 13 is a perspective view of the disk drive 74 similar to disk drive 46 of FIG. 9. It is contemplated that the disk drive 74 includes a lead frame 76 and a housing body 78 respectively similar to the lead frame 52 and housing body 50, however, with a plurality of leads 80 substituted for leads 58. The leads 80 are disposed in a surface mount configuration. In this regard, the disk drive 74 is depicted with a portion of a printed circuit board 82 of a host electronic unit 84. The leads 80 include distal ends 86 thereof which may be mounted upon the printed circuit board 82 for electrical connection with disk drive circuitry 88 disposed upon the printed circuit board 82.

FIG. 14 is a cross sectional view of a portion of the disk drive 74 of FIG. 13 as seen along axis 14-14 and in particular of a lead 80 disposed thereat in the surface mount configuration. The distal end 86 is shown as radially facing outward of a housing periphery 90 of the housing body 78. It is contemplated that other orientations may be utilized such as the distal end 86 being folded under the housing body 78.

As such, according to another embodiment, there is provided a disk drive housing 92 for use with the host electronic unit 84 including the printed circuit board 82 and disk drive circuitry 88. The disk drive housing 92 includes the housing body 78 defining the housing periphery 90. The disk drive housing 92 further includes a lead frame 76 attached to the housing body 78. The lead frame 76 includes the plurality of leads 80 extending to the housing periphery 90. Each of the leads 80 includes a distal end 86 for electrically communicating with the disk drive circuitry 88 with the distal end 86 mounted upon the printed circuit board 82. According to another embodiment, there is provided the disk drive 74 for use with the host electronic unit 84 including the printed circuit board 82 and disk drive circuitry 88. The disk drive 74 includes a disk drive housing 92 as described above.

What is claimed is:

1. A method of manufacturing a disk drive for use with a host electronic unit (HEU), the HEU including a printed circuit board having a disk drive socket and disk drive circuitry in electrical communication with the disk drive socket, the method comprising:

provided a lead frame, the lead frame being a single component having material continuity rather than an assembly of subcomponents;

forming a plurality of leads in the lead frame by removing material of the lead frame;

attaching the lead frame to a housing body, the housing body defining a housing periphery sized and configured to be engaged within the disk drive socket, the plurality of leads extending to the housing periphery for electrically communicating with the disk drive circuitry with the housing body being internally engaged within the disk drive socket;

attaching a disk drive electrical component to the housing body within the housing periphery; and electrically connecting the disk drive electrical component to at least one of the plurality of leads, the leads allowing the disk drive circuitry to control the disk drive electrical component;

wherein the disk drive circuitry is located on the printed circuit board of the HEU rather than within the housing periphery;

wherein the attaching of the lead frame to the housing body includes stamping the lead frame and the housing body.

2. The method of claim 1 wherein the lead frame is formed from a carrier strip.

3. The method of claim 1 wherein the forming of the plurality of leads in the lead frame includes trimming the lead frame.

4. The method claim 3 wherein the trimming of the lead frame occurs prior to attaching of the lead frame to the housing body.

5. The method of claim 3 wherein the trimming of the lead frame occurs after attaching of the lead frame to the housing body.

6. The method of claim 1 wherein the housing body and the lead frame are separately formed.

7. The method of claim 1 wherein the housing body is formed from a carrier strip.

8. The method of claim 1 wherein the disk drive component is a spindle motor.

9. The method of claim 1 wherein the disk drive component is a head stack assembly.

10. The method of claim 1 further comprising electrically insulating the lead frame from the housing body.

\* \* \* \* \*